Patented June 3, 1947

2,421,650

UNITED STATES PATENT OFFICE 2,421,650

PROCESS OF PRODUCING PYRROLES AND HYDROGENATED PYRROLES

Walter Reppe, Curt Schuster, and Emil Weiss, Ludwigshafen-on-the-Rhine, Germany, assignors, by mesne assignments, to General Aniline & Film Corporation, New York, N. Y., a corporation of Delaware No Drawing. Application March 24, 1939, Serial No. 263,902. In Germany March 28, 1938

1 Claim. (Cl. 260—313)

The present invention relates to a new process of producing pyrroles and hydrogenated pyrroles.

We have found that pyrroles or hydrogenated pyrroles can be obtained readily and in good yields by exposing 1.4-dihydroxyalkyl compounds of the general formula:

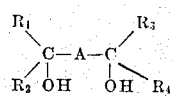

(in which A represents $-CH_2-CH_2-$, $-CH=CH-$ or $-C\equiv C-$ and $R_1$, $R_2$, $R_3$ and $R_4$ are hydrogen or alkyl groups) together with ammonia or primary alkyl-, cycloalkyl-, aralkyl- or aryl amines to the action of catalysts which split off water, at elevated temperatures. When using primary amines there are formed N-substituted pyrroles or hydrogenated pyrroles. There may be used for example methylamine, ethylamine, butylamine, dodecylamine, oleylamine or mixtures of primary amines which contain the alkyl radicles of alcohols from the catalytic reduction of fats or oils or of paraffin oxidation carboxylic acids. Suitable primary cycloaliphatic, araliphatic and aromatic amines are for example cyclohexylamine, abietinylamine, benzylamine, aniline, substitution products and homologues of aniline and naphthylamine.

Among catalysts which split off water there may be mentioned for example aluminium oxide, which may be used in any form, if desired together with activators, bauxite, oxides of thorium, titanium or zirconium and phosphates and borates of weakly basic metals. The catalysts may also be used in admixture with each other or with carrier substances. Temperatures between about 200° and about 400° C. are suitable for carrying out the process; it is preferable to work at from about 260° to 340° C. Increased or reduced pressure may also be employed.

The following examples will further illustrate the nature of this invention but the invention is not restricted to these examples. The parts are by weight.

Example 1

A current of nitrogen containing a vaporous mixture of 93 parts of aniline and 90 parts of 1.4-butane-diol is led at 300° C. over a catalyst containing 95 per cent of aluminium oxide and 5 per cent of thorium oxide. The condensed reaction product is a mixture of water and phenylpyrrolidine which may readily be separated by distillation. The phenylpyrrolidine formed in a good yield passes over as a colorless oil at from 100° to 104° C. at a pressure of 1 millimeter (mercury gauge).

Example 2

A vigorous stream of ammonia containing vaporous 1.4-butane-diol is led at about 300° C. over a catalyst of the kind specified in Example 1. By condensation a mixture is obtained from which, after separating the water by distillation, pyrrolidine is obtained in a good yield.

By using methylamine instead of ammonia, a good yield on N-methylpyrrolidine is obtained under otherwise identical conditions. Instead of the catalyst mentioned above a catalyst consisting of thorium oxide may be used with the same effect.

Example 3

176 parts of 2-butene-1.4-diol and 186 parts of aniline are led at 300° C. in a current of nitrogen over a catalyst consisting of aluminium oxide and thorium oxide during the course of 4 hours.

There collects in the receiver a mixture of water, some unchanged initial material and a solid substance which solidifies in the form of yellowish leaflets. By taking it up in ether, drying, distilling off the ether and frictionation, there is obtained therefrom a good yield of N-phenylpyrroline (boiling point at 8 millimetres (mercury gauge)—from 108° to 118° C., melting point from 52° to 53° C.).

Example 4

180 parts of butane-1.4-diol, 198 parts of cyclohexyl amine and 20 parts of the catalyst referred to in Example 1 are heated together for 6 hours at 300° C. in a pressure-vessel provided with an intensely acting stirring device. After the said time the reaction product is freed from the catalyst by filtration, the water formed removed and the product distilled. Between 200 and 210° C. cyclohexyl pyrrolidine distills over in a good yield; unconverted cyclohexyl amine is obtained in the first runnings.

Example 5

An intense current of a mixture of methylamine and vaporized butane-1.4-diol is passed at 300° C. through a reaction vessel containing bauxite. 1800 grams of butane-1.4-diol and 3700 grams of methylamine are employed per 24 hours and each litre of catalyst. The condensed reaction product is freed from excessive methylamine, water and some unconverted butane-1-4-diol. In the following distillation of the product N-methylpyrrolidine boiling between 75° and 80° C. is obtained in a good yield.

Example 6

An intense current of ammonia and evaporated 2-butine-1.4-diol is passed at 300° C. through a reaction vessel filled with the catalyst referred to in Example 1. 60 grams of 2-butine-1.4-diol and about 180 grams of ammonia are passed per hour and per liter of catalyst through the reaction vessel. The condensed reaction product consists of an aqueous and an oily layer. The latter is fractionally distilled, pyrrole being obtained in a good yield.

If aniline is employed instead of ammonia phenylpyrrole is obtained in an analogous manner.

*Example 7*

A mixture of 118 parts of vaporised 2.5-dihydroxy-n-hexane and of 100 parts of vaporised aniline is passed at 300° C. together with nitrogen through a tube filled with the catalyst referred to in Example 1. The speed of the vapor-current is selected so that 220 parts of the 2.5-dihydroxy-hexane-aniline mixture are passed through the reaction vessel per hour and per liter of catalyst.

The condensed reaction product consists of an aqueous and an oily layer. After removing the aqueous one the oil is dissolved in ether and the ethereal solution dried with calcium chloride and distilled. After the ether and unconverted initial materials N-phenyl-2.5-dimethyl pyrrolidine distils between 80 and 86° C. under a pressure of 0.6 millimeter (mercury gauge) as a colorless liquid.

What we claim is:

A process for producing pyrroles and hydrogenated pyrroles which comprises passing a stream of ammonia containing a vaporous 1.4-dihydroxyalkyl compound of the general formula:

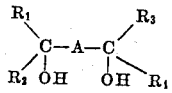

(wherein A represents a member selected from the class consisting of —CH₂—CH₂—, —CH=CH— and —C≡C— and R₁, R₂, R₃ and R₄ represent a member of the class consisting of hydrogen atoms and alkyl groups) over a catalyst selected from the class consisting of the oxides, phosphates and borates of the metals of the third and fourth groups of the Periodic Table, at a temperature between about 200° and 400° C.

WALTER REPPE.
CURT SCHUSTER.
EMIL WEISS.

REFERENCES CITED

The following references are of record in the file of this patent:

UNITED STATES PATENTS

| Number | Name | Date |
|---|---|---|
| 2,251,895 | Reppe et al. | Aug. 5, 1941 |

OTHER REFERENCES

Journal Gen. Chem. (U. S. S. R.), vol. 7, pp. 2945–2949 (1937).

Hollins, Synthesis of Nitrogen Ring Compounds, New York, Van Nostraud, 1924. (Copy in Div. 59, pp. 28–33, and 179.)

Stewart, Recent Advances in Organic Chemistry, sixth ed. Longmans, 1931, New York. (Copy in Scientific Libr., vol. II, p. 291.)

Karrer, Organic Chemistry, Nordeman Pub. Co. 1938, pages 703, 704, 716.

Yu et al., "Chem. Abst." 32, pages 548, 5399. (Pat. Off. Lib.)

Pace, "Chem. Abst." 22, page 3890. (Pat. Off. Lib.)

"J. Amer. Chem. Soc." 58, pages 2487, 2491-2. (Pat. Off. Lib.)

"J. Amer. Chem. Soc." 60, pages 1033-5. (Pat. Off. Lib.)